(12) United States Patent
Ogino

(10) Patent No.: US 6,577,810 B1
(45) Date of Patent: Jun. 10, 2003

(54) METHOD OF RESTRICTING REPRODUCTION FOR INFORMATION SIGNAL, INFORMATION SIGNAL REPRODUCING DEVICE, AND INFORMATION SIGNAL RECORDING MEDIUM

(75) Inventor: Akira Ogino, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/076,832

(22) Filed: May 13, 1998

(30) Foreign Application Priority Data

May 14, 1997 (JP) .............................................. 9-124368

(51) Int. Cl.$^7$ ................................................ H04N 5/76
(52) U.S. Cl. .......................... 386/94; 360/60; 380/201; 380/203
(58) Field of Search ............................ 386/1, 4, 45, 46, 386/52, 64, 94, 95; 360/60; 369/84–85; 380/201, 202, 203; H04N 5/76, 5/92, 9/79

(56) References Cited

U.S. PATENT DOCUMENTS

| 4,975,898 A | 12/1990 | Yoshida | ...................... 369/100 |
|---|---|---|---|
| 5,488,409 A | * 1/1996 | Yuen et al. | ..................... 386/83 |
| 5,764,607 A | 6/1998 | Maeda et al. | ................... 369/47 |
| 5,818,812 A | * 10/1998 | Moribe et al. | ............ 369/275.1 |
| 5,881,038 A | * 3/1999 | Oshima et al. | ................ 369/84 |
| 5,907,655 A | * 5/1999 | Oguro | ........................... 386/94 |

FOREIGN PATENT DOCUMENTS

| DE | 4433868 | 5/1995 |
|---|---|---|
| JP | 04215153 | 8/1992 |

* cited by examiner

*Primary Examiner*—Thai Tran
(74) *Attorney, Agent, or Firm*—Jay H. Maioli

(57) ABSTRACT

When a use permission information detecting unit detects restrictive use permission information, time shift start information, and time shift end information from a reproduced video signal S6 supplied thereto, the use permission information detecting unit forms a use prohibition control signal S7 and supplies it to a use prohibition processing unit. The use prohibition processing unit erases the video signal recorded on a recording medium, on which the restrictive use permission information is add, in accordance with the use prohibition control signal S7 and the like, and makes it impossible to use the video signal repeatedly.

8 Claims, 3 Drawing Sheets

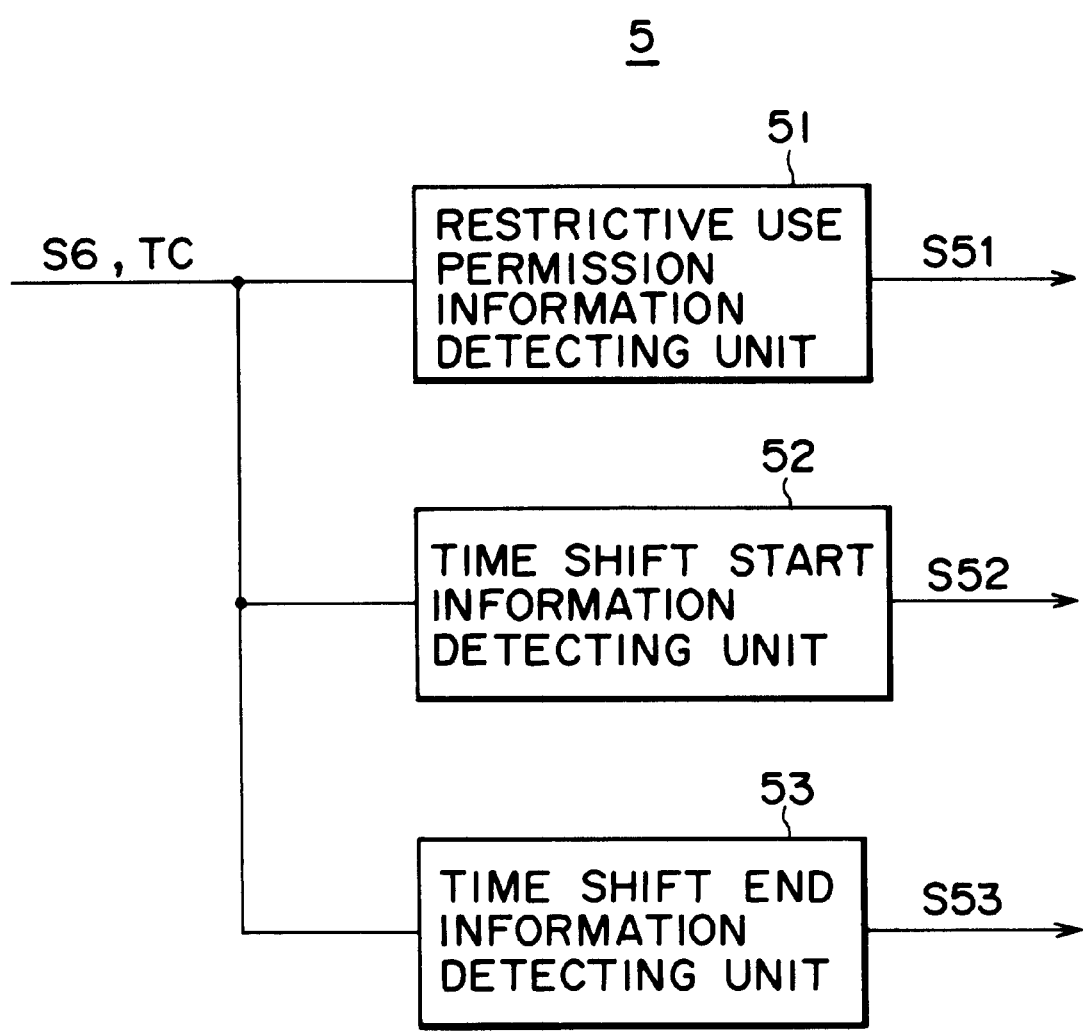

METHOD OF RESTRICTING REPRODUCTION FOR INFORMATION SIGNAL, INFORMATION SIGNAL REPRODUCING DEVICE, AND INFORMATION SIGNAL RECORDING MEDIUM

BACKGROUND OF THE INVENTION

1. Field of the Invention

This invention relates to a method for restricting repeated reproduction of an information signal recorded on a recording medium, and the device of the same.

2. Description of the Related Art

Accompanying the widespread use of video tape recorders (hereunder, referred to as VTR), a lot of software that VTRs can reproduce has been provided. Recently, a digital VTR and a reproducing or recording/reproducing device of a DVD (digital video disc) have been available, and it becomes easy to enjoy videos and sounds of a high picture and sound quality.

On the other hand, however, these devices invite a risk that the readily supplied software is duplicated without restriction. Accordingly, a measure has been taken to prevent a duplication, in which a duplication prevention control is carried out by adding a duplication prevention control signal to control prohibition, permission, or generation restriction of a duplication on an information signal.

FIG. 1 illustrates a basic construction of a recording/reproducing device that deals with a video signal from a VTR, etc., on which a duplication prevention control signal is added, as the information signal. The recording/reproducing device shown in FIG. 1 is supplied with a video signal S11 on which a duplication prevention control signal reproduced, for example, by a reproducing VTR is added.

The video signal S11 having the duplication prevention control signal added thereon is supplied to a writing unit 11 and a duplication prevention control signal detecting unit 12. The writing unit 11 converts the video signal S11 into a video signal S12 for recording so as to record it on a recording medium. The writing unit 11 is controlled by a writing control signal S14 from a writing control unit 13.

The duplication prevention control signal detecting unit 12 detects a duplication prevention control signal added on the video signal S11. Here, the duplication prevention control signal detected is supplied to the writing control unit 13 as a duplication prevention control signal S13.

The writing control unit 13 generates the writing control signal S14 on the basis of the duplication prevention control signal S13 supplied thereto, and controls the writing of the video signal S11 by supplying the writing control signal S14 to the writing unit 11.

The writing unit 11 is designed to write the video signal S11 supplied in a recording medium 100 if the writing control signal S14 from the writing control unit 13 indicates permission of a duplication, and not to write the video signal S11 in the recording medium 100 if the writing control signal S14 indicates prohibition of a duplication.

Further, if the duplication prevention control signal S13 from the duplication prevention control signal detecting unit 12 indicates permission of a duplication only for the first generation, the writing control unit 13 supplies the writing unit 11 with the writing control signal S14 for instructing to permit a duplication and change the duplication prevention control signal S13 added on the video signal S11 into a signal that indicates prohibition of a duplication for the second generation and after.

In this case, the writing unit 11 changes the duplication prevention control signal S13 for the recording video signal S12 into a signal to instruct prohibition of a duplication, and records on the recording medium 100 the recording video signal S12 on which the duplication prevention control signal S13 thus changed is added. Therefore, the video signal S12 recorded on the recording medium 100 cannot be duplicated any further in this case.

And, a signal S15 obtained from the recording medium 100 by reproduction is supplied to a read-out unit 14, which generates a reproduced video signal S16. This reproduced video signal S16 is supplied, for example, to a monitor receiving set to observe.

In this manner, the addition of the duplication prevention control signal S13 on the video signal S11 makes it possible to perform the duplication prevention control of the video signal S11 in accordance with the duplication prevention control signal S13, and to reproduce and observe the video signal S12 recorded on the recording medium 100 as needed.

If the video signal has the duplication prevention control signal added thereon, it is possible to perform the duplication prevention control in accordance with the duplication prevention control signal added on the video signal. However, if the video signal permitted for a duplication is supplied to the recording/reproducing device shown in FIG. 1, it is naturally possible to duplicate the video signal on the recording medium 100, and it is possible to repeatedly reproduce the video signal that has been duplicated on the recording medium 100; and the video signal will be used permanently.

In this manner, if the video signal permitted for a duplication is recorded on the recording medium, repeated reproduction becomes possible, and a further duplication of the video signal recorded on the recording medium becomes possible. Or, by lending the recording medium having the video signal permitted for a duplication recorded thereon to another person, an unspecified number of users will be able to use the same video signal repeatedly without limit.

Thus, when a video signal permitted for a duplication is provided, this video signal is used by an unspecified number of users with a high possibility, whereby the provider of the video signal will be subjected to a disadvantage. To avoid this situation, as mentioned above, it is possible to prohibit the duplication itself by adding the duplication prevention control signal on the video signal provided. This measure, however, is not agreeable to users who receive the supply of video signals, because the users will be subjected to too much restriction on the duplication of the video signal.

SUMMARY OF THE INVENTION

The present invention has been made in view of the foregoing problems, and an object of the invention is to provide a method, device, and recording medium, whereby a provider of information signals such as video signals is able to appropriately restrict the use of the information signals provided.

The invention provides a method for restricting reproduction of an information signal, in which an information signal having reproduction restricting information added thereon is stored, the information signal stored is reproduced, the reproduction restricting information of the information signal is detected, and repeated reproduction of the information signal stored is restricted in accordance with the detection of the reproduction restricting information.

Thereby, the provider of an information signal adds the reproduction restricting information on the information signal to be provided, which will prevent a user from a permanent use, for example, that the user duplicates the provided information signal on a recording medium and reproduces it repeatedly. Further, it is possible to prevent an unspecified number of persons whom the provider of the information signal does not give the authentication from a fraudulent use of the concerned information signal, by lending the recording medium having the provided information signal duplicated thereon to another person and repeating duplication, and the like.

According to another aspect of the method for restricting reproduction of an information signal relating to the invention, an information signal on which reproduction restricting information and identification information for indicating to have reproduced specified information are added is stored, the information signal stored is reproduced, the reproduction restricting information and the identification information of the information signal are detected, and repeated reproduction of the information signal stored is restricted in accordance with the detection of the reproduction restricting information.

Therefore, if the identification information is added, for example, at one position directly before the information finally read out of the information signal, since the obtained information signal is normally read out sequentially from the top, only with the read-out of the leading part of the concerned information signal, the foregoing identification information will not be detected; and therefore, the concerned information signal will not be erased. However, if the concerned information signal is read out to the last and used, the foregoing identification information is detected; and in this manner, if the foregoing identification information is detected, a repeated use of the concerned information signal can be restricted.

Further, the identification information may be a start information and an end information for indicating that a specified length of interval is read out, which are added on separate positions in time of the foregoing information signal.

Thereby, repeated reproduction of the concerned information signal cannot be restricted, if only a part of the concerned information signal is read out which does not include both the foregoing start information and the foregoing end information. If at least the whole information during an interval of which the start position and the end position are determined by the foregoing start information and the foregoing end information is read out and used, the use of the concerned information is identified to be ended, whereby the use of the concerned information can be restricted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings:

FIG. 3 is a block diagram to explain a use permission information detecting unit in the recording/reproducing device shown in FIG. 2.

DESCRIPTION OF THE PREFERRED EMBODIMENT

Figure 1:
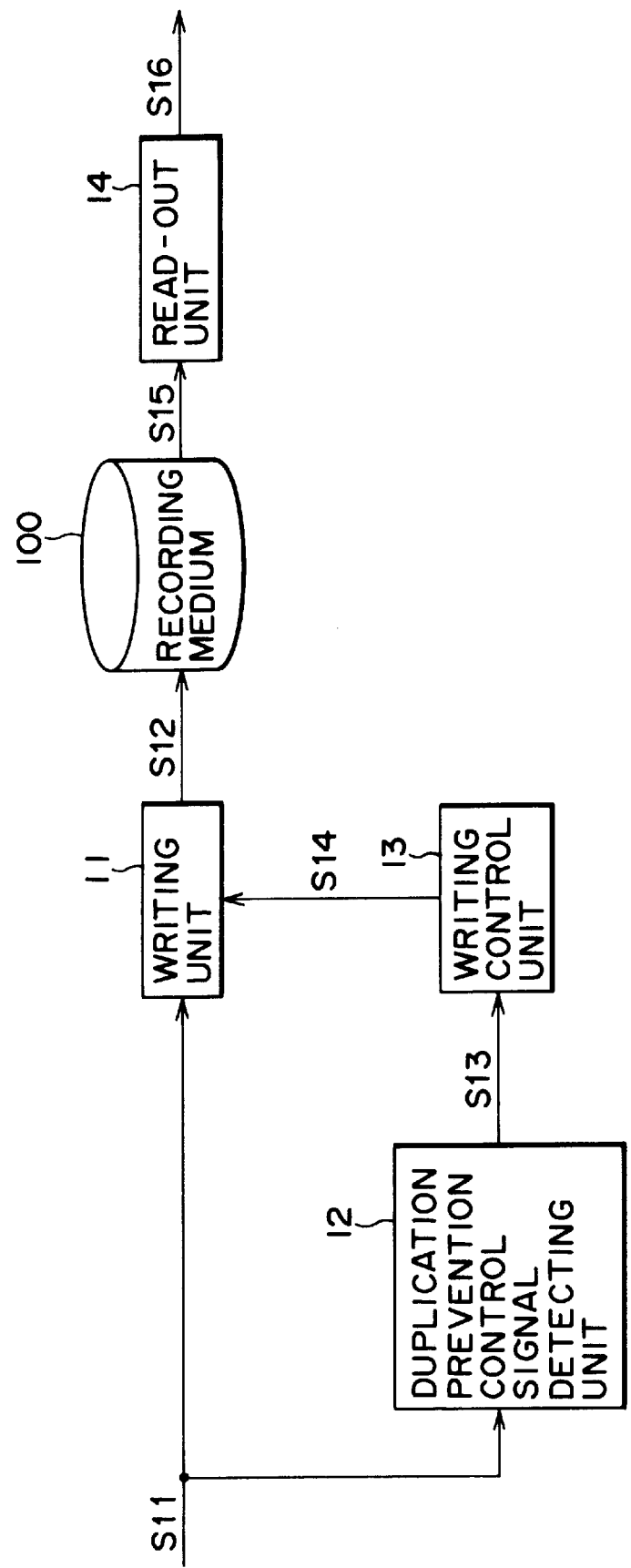
FIG. 1 is a block diagram to illustrate one example of a conventional recording/reproducing device.

The embodiment of a method for restricting reproduction of information signals, an information signal processing device, and an information signal recording medium according to the present invention will hereafter be described in detail with reference to the accompanying drawings.

A video signal recording/reproducing device using the information signal processing device, specifically a VTR, according to this invention will now be described.

Here, the audio signal system will be omitted to simplify the description.

First, an input video signal will be described which is inputted to the video signal recording/reproducing device relating to this embodiment. The input video signal processed in the video signal recording/reproducing device is an analog video signal, on which a duplication prevention control signal that instructs duplication prohibition, duplication permission, and generation restriction of duplication, etc., as the content of control, and a restrictive use permission information (restrictive time shift information) described in detail later, a time shift start information, and a time shift end information are added in advance, for example, during a predetermined horizontal interval in the vertical blanking period.

The restrictive use permission information is an information to restrict the use of the video signal so that, for example, the video signal duplicated can be reproduced and used only for one time, even in case the concerned video signal is supplied with an instruction of duplication permission or generation restriction of duplication by the duplication prevention control signal added on the video signal.

And, the time shift start information and the time shift end information each are added at positions separate in time in advance so as to identify whether the video signal duplicated is reproduced and used or not. For example, the time shift start information is added at a position to which, when a video signal is reproduced from a recording medium, the normal reproduction takes ten minutes from the leading part of this video signal; the time shift end information is added at a position before ten minutes by the normal reproduction from the end of the video signal.

And, the detection of both the time shift start information and the time shift end information during reproduction makes it possible to reliably detect that the video signal has been reproduced from a position where the time shift start information is added to a position where the time shift end information is added. In this manner, when the video signal during a predetermined interval has been reproduced, the concerned video signal is made to be identified that it has been reproduced and used.

Thereby, if only a part of the video signal duplicated is reproduced, the video signal is made to be identified that it has not been reproduced and used; and in this case, the use of the concerned video signal according to the above-mentioned restrictive use permission information is made not to be restricted. That is, the use of the video signal duplicated is made not to be restricted more than needed.

These duplication prevention control signal, restrictive use permission information, time shift start information, and time shift end information each are formed of one bit or some bits, and are added in advance at different positions during a predetermined horizontal interval in the vertical blanking period of the video signal.

The embodiment described hereunder assumes that the input video signal has a restrictive use permission information to permit reproduction for one time added thereon, a time shift start information added in a predetermined horizontal interval in the vertical blanking period corresponding to a position to which the normal reproduction takes ten minutes from the top of the concerned input video signal, and a time shift end information added in a predetermined horizontal interval in the vertical blanking period corresponding to a position before ten minutes in the normal reproduction from the end of the video signal.

Figure 2:
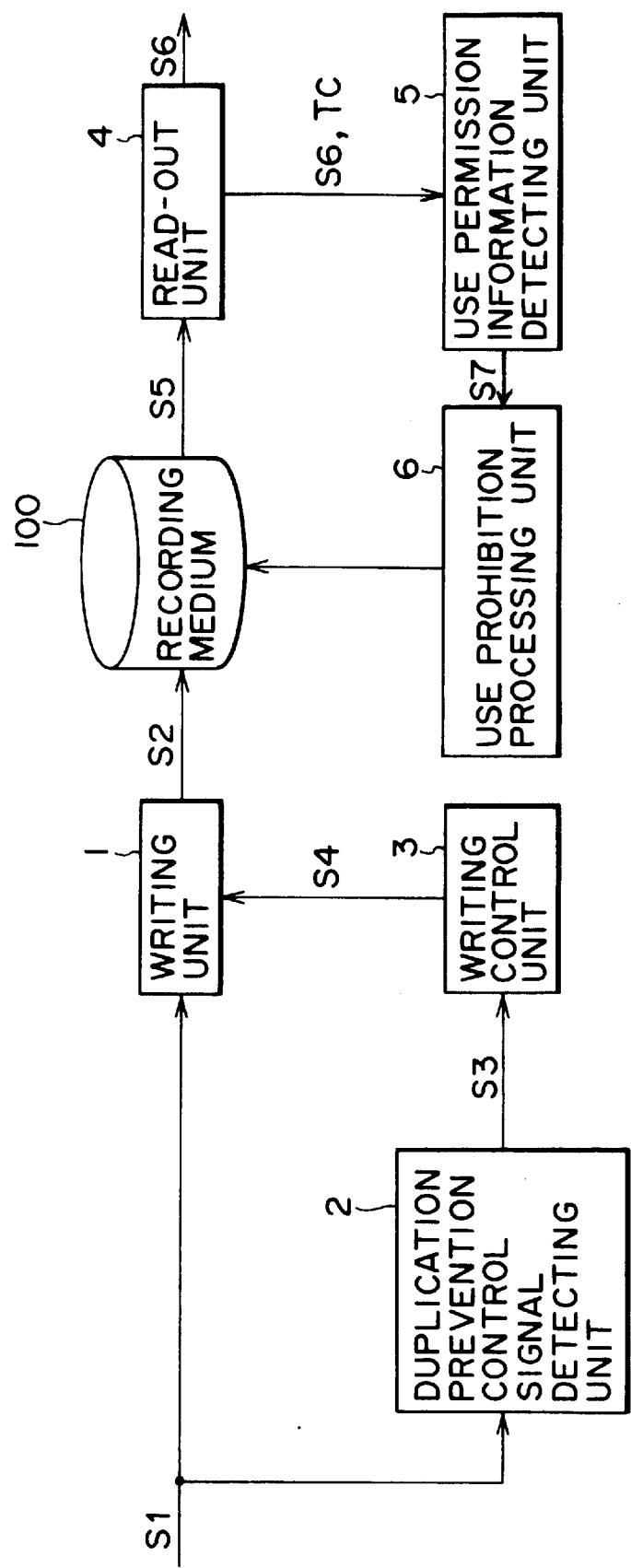
FIG. 2 is a block diagram to explain one embodiment of a recording/reproducing device according to the present invention.

FIG. 2 is a chart to explain a video signal recording/reproducing device according to the invention. As shown in FIG. 2, the video signal recording/reproducing device contains a writing unit 1, a duplication prevention control signal detecting unit 2, a writing control unit 3, a read-out unit 4, a use permission information detecting unit 5, and a use prohibition processing unit 6. And, a recording medium 100 is a video tape.

First, the recording operation will be described. The recording/reproducing device shown in FIG. 2 is supplied at its input with an input video signal S1 in which the foregoing duplication prevention control signal, the restrictive use permission information, the time shift start information, and the time shift end information are added on a video signal reproduced by a reproducing VTR or a video signal tuned by a TV tuner.

The input video signal S1 is supplied to the writing unit 1 and the duplication prevention control signal detecting unit 2. The writing unit 1 converts the video signal S1 supplied thereto into a recording video signal S2 suitable for recording so as to record the video signal S2 on the recording medium 100. The writing unit 1 is controlled on writing by a control signal S4 from the writing control unit 3, as described later.

The recording video signal S2 formed in the writing unit 1 is a signal which the input video signal S1 is converted into, which contains the duplication prevention control signal, the restrictive use permission information, the time shift start information, and the time shift end information as they are.

The duplication prevention control signal detecting unit 2 detects the duplication prevention control signal added on the input video signal S1. The duplication prevention control signal detected is supplied to the writing control unit 3 as a duplication prevention control information S3.

The writing control unit 3 generates the control signal S4 to be supplied to the writing unit 1 on the basis of the duplication prevention control information S3, and controls the writing unit 1 by supplying the control signal S4 to the writing unit 1.

Therefore, the writing control unit 3 generates the control signal S4 to permit a duplication, if the duplication prevention control information S3 is an information that indicates permission to duplicate the video signal. The writing control unit 3 generates the control signal S4 to prohibit a duplication, if the duplication prevention control information S3 is an information that indicates prohibition to duplicate the video signal, and supplies the control signal S4 to the writing unit 1.

Further, if the duplication prevention control information S3 is an information that indicates to permit duplication only for the first generation, the writing control unit 3 generates the control signal S4 to permit a duplication for the first generation and modify the content of the duplication prevention control signal of the recording video signal S2 into duplication prohibition from the second generation and after, and supplies the control signal S4 thus formed to the writing unit 1.

The writing unit 1 writes the recording video signal S2 on the recording medium 100, if the control signal S4 indicates permission to write; and if the control signal S4 indicates prohibition to write, the writing unit 1 controls not to write the recording video signal S2 on the recording medium 100.

Further, if the duplication prevention control signal added on the video signal S1 indicates duplication permission only for the first generation and the control signal S4 from the writing control unit 3 permits to record and instructs to modify the content of the duplication prevention control signal into prohibition to record, the writing unit 1 modifies the content of the duplication prevention control signal added on the recording video signal S2 into prohibition to record, and thereafter, records the modified on the recording medium 100. In this case, the video signal recorded on the recording medium 100 is made not to be duplicated.

Next, the reproducing operation will be described. The read-out unit 4 forms a reproduced video signal S6 on the basis of a signal S5 obtained by reproducing the recording medium 100 and outputs the reproduced video signal S6. The reproduced video signal S6 is supplied, for example, to a monitor receiving set (not illustrated) to be used for the video reproduction, and also to the use permission information detecting unit 5. Further, the read-out unit 4 reads out a time code TC recorded on the recording medium 100, and supplies it to the use permission information detecting unit 5.

The use permission information detecting unit 5 detects the restrictive use permission information, the time shift start information, and the time shift end information which are added on the reproduced video signal S6 formed on the basis of the signal S5 obtained by reproducing the recording medium 100. When these three informations have been detected from the reproduced video signal S6, the use permission information detecting unit 5 forms a use prohibition control signal S7 in accordance with the restrictive use permission information, and supplies it to the use prohibition processing unit 6.

FIG. 3 is a chart to explain a part provided in the use permission information detecting unit 5, which detects the restrictive use permission information, the time shift start information, and the time shift end information. As shown in FIG. 3, the use permission information detecting unit 5 is provided with a part to detect the information used for restricting the use of the video signal, which is comprised of a restrictive use permission information detecting unit 51, a time shift start information detecting unit 52, and a time shift end information detecting unit 53. These units 51 to 53 each are supplied with the reproduced video signal S6 and the time code TC from the read-out unit 4.

The restrictive use permission information detecting unit 51 detects the restrictive use permission information added on the reproduced video signal S6, and if it is detected, the detecting unit 51 outputs the restrictive use permission information detected as a signal S51.

The time shift start information detecting unit 52 detects the time shift start information and an address information thereof added on the reproduced video signal S6. And, detecting the time shift start information, the time shift start information detecting unit 52 outputs an address information (hereunder, referred to as a start address information) to indicate a position on the recording medium 100, at which the time shift start information obtained by the time code TC supplied from the read-out unit 4 is added, as a signal S52.

Similarly, the time shift end information detecting unit 53 detects the time shift end information and an address information thereof added on the reproduced video signal S6. Detecting the time shift end information, the time shift end information detecting unit 53 outputs an address information (hereunder, referred to as an end address information) to indicate a position on the recording medium 100, at which the time shift end information obtained by the time code TC supplied from the read-out unit 4 is added, as a signal S53.

And, when the foregoing detecting units 51 to 53 have detected the restrictive use permission information, the time shift start information, and the time shift end information, the use permission information detecting unit 5 forms the use prohibition control signal S7 comprised of the restrictive use permission information S51, the start address information S52, and the end address information S53, and supplies it to the use prohibition processing unit 6.

That is, when the restrictive use permission information detecting unit 51 has detected the restrictive use permission information from the reproduced video signal S6, the use permission information detecting unit 5 acknowledges that the use of the video signal to be reproduced as the reproduced video signal S6, recorded on the recording medium 100, is restricted to one time.

Further, when the time shift start information detecting unit 52 has detected the time shift start information and the time shift end information detecting unit 53 has detected the time shift end information, the use permission information detecting unit 5 acknowledges that the video signal during an interval predetermined by the time shift start information and the time shift end information added on the video signal, reproduced as the reproduced video signal S6, recorded on the recording medium 100, has been reproduced and used, and the use of the concerned video signal restricted to one time has been finished.

Thus, when acknowledging that the use of the concerned video signal is restricted to one time and the use thereof has been finished, the use permission information detecting unit 5 forms to output the use prohibition control signal S7.

When it is supplied with the use prohibition control signal S7 and it detects that the reproduction processing is finished, the use prohibition processing unit 6 erases the video signal recorded on the recording medium 100 on the basis of the use prohibition control signal S7, and prohibits the repeated use of the video signal recorded on the recording medium 100. That is, the use prohibition processing unit 6 possesses a function as use restricting means to restrict the use of the video signal on which the restrictive use permission information is added, on the basis of the use prohibition control signal S7.

That is, if the use prohibition processing unit 6 is provided with the use prohibition control signal S7 and a stop key as the operation button key for stopping a reproducing or recording process is operated which is equipped with the video signal recording/reproducing device, or if the reproducing process is executed to the end of the recording medium 100 to stop the reproducing operation, the use prohibition processing unit 6 rewinds the recording medium 100 being a video tape at least to a position that the start address information indicates, and writes an erase signal from the foregoing position at least to a position that the end address information indicates.

The foregoing operation erases the video signal recorded on the recording medium 100, on which the restrictive use permission information indicating that reproduction is restricted to one time is added, thereby disabling the concerned video signal to be used repeatedly.

As described above, to erase the video signal from a position on the recording medium 100 that the start address information indicates to a position on the recording medium 100 that the end address information indicates will erase only the video signal having the restrictive use permission information added thereon. Accordingly, the other video signal recorded on the other area of the recording medium 100 will not be erased.

In this manner, to add a restrictive use permission information on the video signal will restrict the use of the video signal on the basis of the restrictive use permission information. It is accordingly possible to prevent a user from lending the recording medium having the video signal recorded to another person, to prevent the another person from further duplicating the video signal, and to prevent unspecified number of users from using the video signal duplicated.

On the other hand, the provider of the video signal is able select to approve the permanent use or to restrict the reproduction for each and every video signal supplied. That is, the provider of the video signal is given the option as to approving the repeated use (using the time shift information) of the video signal or not.

Accordingly, the provider of the video signal is able to control to subdivide the mode in use of the video signal, and when providing the video signal to users, the provider is able, for example, to set the rental fee low as to the video signal of which the reproduction is restricted to one time, and to set the rental fee high as to the video signal of which the permanent use is approved. Therefore, the user who seeks, for example, a video signal of which reproduction is sufficient only for one time is able to receive the supply of the video signal at a low fee.

Further, this embodiment has been described on the presumption that the time shift start information is added at a position to which the reproduction of the video signal takes ten minutes from the leading part of the video signal, and the time shift end information is added at a position before ten minutes from the end of the video signal. However, the invention is not limited to this.

For example, the time shift information may be arranged such that, in accordance with the time length for the total reproduction of a video signal, the time shift start information is added at a position adjacent to the top of the video signal and the time shift end information is added at a position adjacent to the end of the video signal, considered to be reproduced securely during reproduction of the video signal.

Further, in this embodiment, the time shift start information and the time shift end information are added at positions separate in time, as identification information to identify whether the video signal duplicated on the recording medium 100 has been reproduced and used or not. However, it is not necessarily required to add the time shift start information and the time shift end information on the video signal.

For example, it may be arranged that the identification information to identify whether the video signal duplicated has been reproduced and used or not is not added on the video signal, only the restrictive use permission information is added thereon, and the use of the concerned video signal is made to be restricted if this restrictive use permission information is detected during reproduction thereof.

Further, it may be arranged that one flag information, as identification information to identify whether the video signal duplicated on the recording medium 100 has been reproduced and used or not, is added at one specific position on the concerned video signal, and the concerned video signal is identified to have been reproduced and used if this flag information is detected.

For example, since the video signal recorded on the recording medium 100 is a time series signal and it is normally reproduced and used from the top, if the flag information as identification information is added on a position adjacent to the end of the concerned video signal and this flag information is detected, then the concerned video signal can be identified to have been reproduced and used from the top to the end.

Further, it may be arranged that flag information as identification information to identify whether the concerned video signal has been reproduced and used or not are added at a plurality of positions on the video signal, and the concerned video signal is identified to have been reproduced and used if all or some of the plural flag information are detected.

Further, the foregoing embodiment has been described in a case that duplication and reproduction of the video signal on which the duplication prevention control signal, the restrictive use permission information, the time shift start information, and the time shift end information are added are performed by one and the same recording/reproducing device. However, the invention is not limited to such a case that record and reproduction are performed by one and the same device.

For example, even in a case that a video signal is duplicated by the other recording device, the video signal on which the duplication prevention control signal, the restrictive use permission information, the time shift start information, and the time shift end information are added is recorded on a recording medium, and the video signal on the recording medium is made to be reproduced by the recording/reproducing device of this embodiment, the use of the video signal recorded on the recording medium can be restricted in accordance with the restrictive use permission information, the time shift start information, and the time shift end information as mentioned above.

That is, if a recording medium having the video signal recorded, on which the restrictive use permission information, the time shift start information, and the time shift end information are added, is made, the use of the concerned video signal can be restricted during reproduction of the video signal recorded on this recording medium, in accordance with the restrictive use permission information, the time shift start information, and the time shift end information which are added on the video signal.

Further, the foregoing embodiment has been described on the assumption that the duplication prevention control signal, the restrictive use permission information, the time shift start information, and the time shift end information are added on the input video signal during a predetermined horizontal interval of the vertical blanking period thereof, which however is not limited to this.

For example, it may be arranged that the duplication prevention control signal, the restrictive use permission information, the time shift start information, and the time shift end information are spread in spectrum, and the spread spectrum information are superimposed on the input video signal. In this case, to execute the reverse spectrum spreading will extract the information superimposed on the video signal.

In this manner, the necessary condition for the duplication prevention control signal, the restrictive use permission information, the time shift start information, and the time shift end information is that these information can be recorded on a recording medium with a video signal during recording and can be used to be read out from the recording medium in accordance with the reproduced video signal during reproduction.

Further, in the foregoing embodiment, the use prohibition processing unit 6 is assumed to erase the video signal from a position on the recording medium 100 that the start address information indicates to a position that the end address information indicates; which however is not limited to this, and all the concerned video signal may be erased.

Further, in the foregoing embodiment, the use prohibition processing unit 6 is assumed to erase the video signal recorded on the recording medium 100, on which the restrictive use permission information is added, which however is not limited to this. It may be arranged that the concerned video signal is made impossible to be used by disabling the concerned video signal to be normally reproduced, for example, by disturbing the video signal having the restrictive use permission information added thereon, by making the reproduced image difficult to be discerned by noise, or the like.

Further, in the foregoing embodiment, the information signal is assumed to be an analog video signal, which however is not limited to the analog video signal. For example, the information signal may be an audio signal or data of various types. And, naturally the information signal may be not only analog video signals, but also digital video signals.

Further, the recording/reproducing device in the foregoing embodiment is assumed to be a VTR, which however is not limited to a VTR. It is possible to apply the invention to various types of recording/reproducing devices and reproducing devices such as a recording/reproducing device and reproducing device called them minidisc (MD) using a small-sized optical disk as the recording medium, and a recording/reproducing device and reproducing device using the DVD (digital video disc) as the recording medium.

Further, in case of a TV broadcasting or cable TV broadcasting, broadcasting a video signal, adding thereon the restrictive use permission information, and the time shift start information and the time shift end information as identification information for identifying whether the concerned video signal has been reproduced and used will restrict the use of the concerned video signal if the video signal having these informations added is duplicated.

Further, in case of transmitting and receiving information signals between computers as the so-called personal computer communication, transmitting an information signal, adding thereon the restrictive use permission information, and the time shift start information and the time shift end information as identification information for identifying whether the concerned information signal has been reproduced and used will restrict the use of the concerned information signal.

According to the invention described above, it is possible to restrict the use of an information signal on the basis of the restrictive use permission information added in advance on the information signal, which prevents a recording medium having the information signal recorded from being subleased or the information signal from being duplicated. Thereby, it is possible to protect the provider of the information signal from being subjected to a disadvantage.

Further, the provider of the information signal is able to select to approve a permanent use for each and every information signal supplied, or to restrict the reproduction, by adding the restrictive use permission information on the information signal or not. Namely, it is possible to give the option to the provider of the information signal as to whether the provider approves the repeated use (by using the time shift information) of the information signal or not.

Thereby, the provider of the information signal is able to control to subdivide the mode in use of the information signal, and accordingly, the provider can set the rental fee of the video signal low as to, for example, the video signal that the provider restricts the reproduction to one time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for restricting reproduction of an information signal, comprising the steps of:

storing an information signal to which reproduction restricting information, time shift information, and time shift end information are added;

reproducing the information signal to be output to a user following the step of storing;

detecting the reproduction restricting information, the time shift information, and the time shift end information in the reproduced information signal; and restricting subsequent repeated reproducing of the information signal to the user based on the detected reproduction restricting information, the time shift start information, and the time shift end information.

2. The method for restricting reproduction of an information signal as claimed in claim 1, comprising the further step of adding the time shift information and the time shift end information at one specified position in the information signal.

3. The method for restricting reproduction of an information signal as claimed in claim 1, comprising the further step of adding the time shift information and the time shift end information at separate positions in time to the information signal.

4. The method for restricting reproduction of an information signal as claimed in claim 1, wherein the step of restricting repeated reproducing of the information signal includes the step of disabling reproduction of the information signal stored in the step of storing.

5. The method for restricting reproduction of an information signal as claimed in claim 4, wherein the information signal is a video signal, and the step of disabling reproduction of the information signal includes the step of distorting the display of the video signal.

6. An information signal reproducing device comprising:

information signal storing means for storing an information signal to which reproduction restricting information, time shift information, and time shift end information are added;

reproduction means for reproducing the information signal to be output to a user stored in said information signal storing means;

detection means for detecting the reproduction restricting information, the time shift information, and the time shift end information in said information signal; and reproduction restricting means for restricting repeated reproduction of the information signal stored in said information signal storing means to the user in accordance with the detection of the reproduction restricting information, the time shift information, and the time shift end information by said detection means.

7. The information signal reproducing device as claimed in claim 6, wherein the time shift information and the time end information are added at a specified position in the information signal.

8. The information signal reproducing device as claimed in claim 6, wherein the time shift information and the time shift end information are added at separate positions in time to the information signal.

* * * * *